United States Patent
Ett et al.

(10) Patent No.: US 8,524,389 B2
(45) Date of Patent: Sep. 3, 2013

(54) PLATE FOR A BIPOLAR BATTERY AND A BIPOLAR BATTERY

(75) Inventors: Gerhard Ett, São Paulo (BR); Angelo Massatoshi Ebesui, São Paulo (BR); Gilberto Janólio, Carapicuiba (BR); Volkmar Ett, São Paulo (BR)

(73) Assignee: Electrocell Industria e Comercio de Equipamentos Eletricos Ltda., Sao Paulo (BR)

( * ) Notice: Subject to any disclaimer, the term of this patent is extended or adjusted under 35 U.S.C. 154(b) by 221 days.

(21) Appl. No.: 12/672,147

(22) PCT Filed: Aug. 6, 2008

(86) PCT No.: PCT/BR2008/000230
§ 371 (c)(1),
(2), (4) Date: Jul. 7, 2010

(87) PCT Pub. No.: WO2009/018637
PCT Pub. Date: Feb. 12, 2009

(65) Prior Publication Data
US 2011/0143186 A1 Jun. 16, 2011

(30) Foreign Application Priority Data
Aug. 6, 2007 (BR) .................................. 0703410

(51) Int. Cl.
*H01M 10/18* (2006.01)
*H01M 10/02* (2006.01)

(52) U.S. Cl.
USPC ........... 429/152; 425/153; 425/232; 425/228; 425/210

(58) Field of Classification Search
USPC ................... 429/152–153, 232, 225, 228, 210
See application file for complete search history.

(56) References Cited

U.S. PATENT DOCUMENTS 3,930,881 A * 1/1976 Cestaro et al. ................. 429/204
4,539,268 A * 9/1985 Rowlette ........................ 429/54
(Continued)

FOREIGN PATENT DOCUMENTS

DE 35 32 697 A1 4/1987
EP 0 809 311 A1 11/1997
(Continued)

OTHER PUBLICATIONS

McGregor, K., *Active-Material Additives for High-Rate Lead/Acid Batteries: Have There Been Any Positive Advances?*, Journal of Power Sources, vol. 59, 1996, pp. 31-43.

(Continued)

*Primary Examiner* — Joseph S Del Sole
*Assistant Examiner* — Nahida Sultana
(74) *Attorney, Agent, or Firm* — Alston & Bird LLP

(57) ABSTRACT

The present invention relates to a plate (20), particularly for a bipolar battery (10), the plate (20) being of the type that comprises a base graphite material (2), a positive active material (3) applied to a first surface (4) of the base material (2) and a negative active material (5) applied to a second surface (6) of the base material (2) opposite the first surface (4), the positive active material (3) having a composition that comprises lead dioxide, conductive carbon fibers and glass microspheres, and the negative active material (5) having a composition that comprises spongy lead, graphite additives and glass microspheres. One further describes a bipolar battery (10) formed by a plurality of plates (20), each plate (20) comprising a graphite base material (2), positive active material (3) applied to the first surface (4) of the base material (2) and negative active material (5) applied to a second surface (6) of the base material (2), opposite the first surface (4), the positive active material (3) of the plurality of plates (20) having a composition that comprises lead dioxide, conductive carbon fibers and glass microspheres, and the negative active material (5) of the plurality of plates (20) having a composition that comprises spongy lead, graphite additives and glass microspheres.

12 Claims, 2 Drawing Sheets

(56) References Cited

U.S. PATENT DOCUMENTS

| | | | |
|---|---|---|---|
| 5,106,709 A * | 4/1992 | Tekkanat et al. | 429/210 |
| 5,334,646 A * | 8/1994 | Chen | 524/474 |
| 5,344,727 A * | 9/1994 | Meadows et al. | 429/210 |
| 5,549,990 A * | 8/1996 | Clough et al. | 429/204 |
| 5,667,917 A | 9/1997 | Edwards et al. | |
| 5,916,709 A * | 6/1999 | Arias et al. | 429/210 |
| 6,316,148 B1 | 11/2001 | Timmons et al. | |
| 2004/0219428 A1 * | 11/2004 | Nagayama | 429/218.1 |
| 2006/0292448 A1 | 12/2006 | Gyenge et al. | |
| 2011/0294008 A1 * | 12/2011 | Lara-Curzio et al. | 429/210 |

FOREIGN PATENT DOCUMENTS

| | | |
|---|---|---|
| GB | 439917 A | 12/1935 |
| WO | WO 2006/105188 A1 | 10/2006 |

OTHER PUBLICATIONS

Wang, S. et al., *Effects of Additives on the Discharge Behaviour of Positive Electrodes in Lead/Acid Batteries,* Journal of Power Sources, vol. 55, 1995, pp. 47-52.

International Search Report and Written Opinion for International Appl. No. PCT/BR2008/000230 mailed Nov. 28, 2008.

* cited by examiner

PLATE FOR A BIPOLAR BATTERY AND A BIPOLAR BATTERY

The present invention relates to plates that are particularly used on bipolar batteries, these plates comprising a base material of composite materials that involve a graphite core and receive significant layers of positive and negative active materials, which comprise additives capable of enlarging the reaction surface area This invention further relates to a bipolar battery formed by a plurality of these plates and that presents a greater output with respect to similar batteries known from the prior art.

DESCRIPTION OF THE PRIOR ART

In bipolar batteries, distribution plates are arranged parallel and consecutively with respect to each other, forming cells that are stacked, in construction of the "sandwich" type, so that one same plate has a negative face that interacts with the positive face of the immediately preceding plate and its positive opposite face that interacts with the negative face of the immediately following plate. These plates are also known as double electrodes, since one side or face of the electrode acts as an anode in a cell and the opposite side or face of this same electrode acts as a cathode in the following cell. The anodic and cathodic faces are separated by an electronic conductor.

By lead-acid battery one understands a battery that can be bipolar or not, which comprises an anode and a cathode comprising active materials derived from lead and arranged in an electrolyte consisting of a sulfuric acid solution. The positive plate or anode comprises lead oxide (PbO) as an active matter and, when electrically charged, it transforms the lead oxide into lead dioxide ($PbO_2$). As a rule, this active matter is fixed on a metallic grate made of alloy-lead. The negative plate or cathode comprises, as an active matter, lead oxide (PbO) and an expanding agent, transforming the lead oxide into spongy lead (Pb). This active matter is also fixed on a metallic grid of alloy-lead.

The plates of the lead-acid battery are separated by a porous material which acts as a separator, manufactured from an electronically insulating material, of low ohmic resistance, microporous and of good ionic conductance when filled with acid. The purpose of this separator is to reduce to a minimum the internal resistance of the elements and the distance between the plates, since they are positioned between the plates (anode and cathode) preventing direct contact, besides of not permitting short-circuit, and at the same time maintaining a minimum space between the plates. The electrolytic solution in which the plates are dipped consists of a solution of sulfuric acid diluted in distilled or demineralized water.

Bipolar lead-acid batteries are already known from the prior art, and one has been studying much about the plates or electrodes that compose them, with a view to obtain them in a more economical manner, with less use of lead, lighter and, at the same time, providing greater density of energy and lifespan to the batteries.

Document PI 8305957 and document PI 8305961 show examples of the above-described matter. These documents disclose batteries of the lead-acid type, comprising positive and negative plates arranged in stacks, alternated and intercalated by a separating material. The electrode elements that compose this battery are formed by spaced-apart grids, continuous and made of lead or lead-alloy, which receive positive or negative active material. These electrodes consist of think lead plates overlapping each other so as to form a laminated structure. In this case, the plates are further made of pure lead, even though they are formed by multiple lead blades, which does not reduce the weight of the plate and the manufacture cost of the battery.

Modifying the composition of the plates or electrodes, the document U.S. Pat. No. 5,532,083 describes battery electrodes made from a polymeric material containing multiple oriented carbon fibers. The objective of this type of electrode construction is to achieve greater flexibility.

Document U.S. Pat. No. 5,643,696 relates to battery plates with a lighter core to be used in bipolar batteries of the lead-acid type. In this case, the plate core is preferably made from aluminum, while one may also use: titanium, steel, steel alloy, magnesium or zinc. The core is then coated with negative and positive active materials, as in the other batteries of this type. The objective in this case is to reduce the weight of the plate by means of a core made of a lighter material, however, one observes a low output of the active materials applied to the plates.

Document U.S. 2004/0072074 also describes electrodes used in lead-acid-type batteries, these electrodes being made in a polymeric matrix, without pores, and some of the surfaces of this matrix are covered with positive and negative active materials. in this case, the objective is to obtain very thin electrodes, without the occurrence of oxidation.

In document U.S. Pat. No. 4,275,130, one describes a construction of a bipolar battery. The plates are arranged parallel and compressed so as to form a stack, and the objective of this invention is to obtain thin and lighter plates of resistant materials, suitable for the necessary conductivity and resistant to corrosion. For this purpose, one describes the composition of the plates containing resin as the main substrate, on which conductive graphite fibers are added, preferably at the proportion of 50% by weight. Positive ($PbO_2$) and negative (Pb) active materials are applied onto this substrate.

Further continuing the development of lighter and resistant plates or electrodes, document U.S. Pat. No. 7,105,252 discloses electrodes that are covered with a thin layer of carbon film prior to application of the active material. The function of the carbon film is to decrease corrosion. On the other hand, documents WO 2005/096418 and WO 2006/105188, of the same applicant of the preceding document, relate to bipolar batteries containing electrodes formed by a substrate of a polymeric material with conductive particles that may be carbon fibers.

Document EP 1.506.585 makes reference to bipolar battery plates manufactured with carbon-fiber reinforcement on the thermoplastic material. The base of these plates is made of graphite and thermoplastic for the same purpose of obtaining lighter and resistant plates.

Although the above-cited prior-art documents represent developments, some of which being significant, in the construction of plates or electrodes that compose lead-acid-type bipolar batteries, all the plates described in these documents are for use in high discharge current, that is to say, very high power for short periods of functioning and with discharge peak at starts. These characteristics limit the performance of these batteries and when one needs very low discharge currents, that is to say, low power.

OBJECTIVES OF THE INVENTION

The present invention has the objective of providing plate or electrodes for bipolar battery, these plates or electrodes comprising positive and negative active materials with addition of additives to increase the conductivity and, consequently, the reaction surface area and also to increase the reaction output of these active materials.

It is also an objective of this invention to provide a bipolar battery formed by the plates or electrodes, which eliminate the traditional lead grids, with positive and negative active materials, with participation of additives, providing greater energy capacity and density, on the order of 60 Wh/kg in long discharges, in comparison with traditional batteries that have energy densities on the order of 38 Wh/kg, which is an essential characteristic for application in solar/photovoltaic systems.

BRIEF DESCRIPTION OF THE INVENTION

The object of the invention is a plate 20, particularly for a bipolar battery 10, the plate 20 being of the type that comprises a base material 2, a positive active material 3 applied to a first surface 4 of the base material 2 and a negative material 5 applied to a second surface 6 of the base material 2 opposite the first surface 4, the base material 2 containing graphite in its composition and coated with lead or lead alloy, the positive active material 3 containing lead dioxide, carbon fibers and glass microspheres in its composition, said positive active material 3 having a thickness ranging from 3 to 15 mm, and the negative active material 5 containing spongy lead, graphite additives and glass microspheres in its composition, said negative active material 5 having a thickness ranging from 3 to 15 mm.

A further object of this invention is a bipolar battery 10 formed by a plurality of plates 20, each plate 20 comprising a base material 2, a positive active material 3 applied to a first surface 4 of the base material 2 and a negative active material 5 applied to a second surface 6 of the base material 2, opposite the first surface 4, the base material of the plate 20 of the bipolar battery 10 containing graphite in its constitution and coated with lead or lead alloy, the positive active material 3 containing lead dioxide, carbon fibers and glass microspheres, said positive active material 3 having a thickness ranging from 3 to 15 mm, and the negative active material 5 containing spongy lead, graphite additives and glass microspheres in its constitution, said negative active material 5 having a thickness ranging from 3 to 15 mm.

BRIEF DESCRIPTION OF THE FIGURES

The present invention will now be described in greater detail with reference to an embodiment represented in the drawings. The figures show.

DETAILED DESCRIPTION OF THE FIGURES

Figure 1:
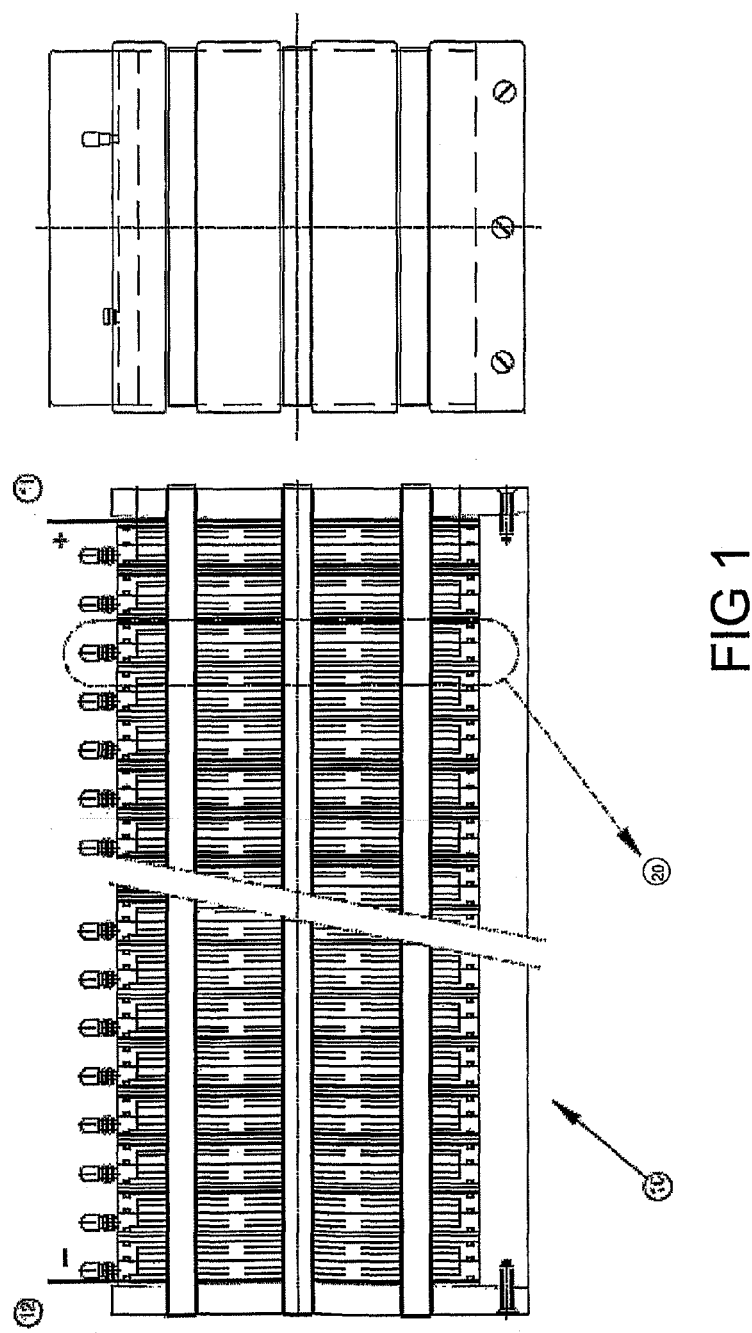
FIG. 1 is a side view of a bipolar battery 10, object of this invention.
Figure 2:
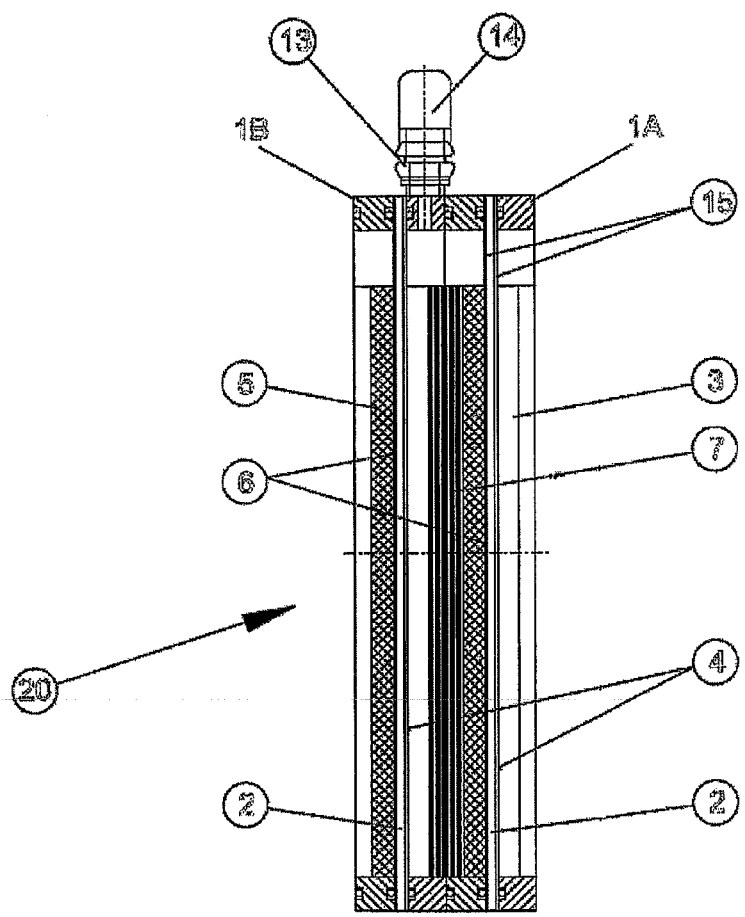
FIG. 2 is a cross-sectional detail view of the plates 20 or electrodes for a bipolar battery 10, object of this invention.

According to a preferred embodiment and as can be seen from FIG. 2, the plate 20 object of the present invention is particularly used on bipolar batteries 10, as illustrated in FIG. 1. For this purpose, the plate 20 comprises a base material 2 which constitutes a base-composite composition formed by graphite filler and additives. The graphite filler is formed by thin round particles, having size from 5 to 7 μm, and coarse round particles, having size from 70 to 80 μm. The thin round particles are present in an amount equivalent to 30% of the total of the graphite filler, the rest being formed by coarse round graphite particles. It is important to point out that one should always maintain a ratio of 1:10 to 1:15 by size. In addition to graphite and additives, the base material 2 further receives carbon nanotubes in amounts varying from 0.3 to 11% by weight. This addition of carbon nanotubes enables one to surprisingly increase and make uniform the mechanical strength and electrical conductivity. This base material is the object of patent document PI 0604768-8 (BRPI0604768), filed on Nov. 6, 2006, and all of its characteristics will be herein referenced and incorporated.

The base-material 2 composition enables one to obtain lightweight plates 20, made of an electrically conductive material and quite resistant to corrosion, which is an important factor, since the plates 20 are dipped into an acidic electrolytic solution.

This base material 2 receives a lead or lead-alloy coating 15, which may be made through juxtaposition, injection or deposition processes. When the process of coating the base material 2 with lead or lead-alloy is carried out by juxtaposition or injection, the layers of lead or lead alloy should be at least 50 micrometers thick and at most 500 micrometers thick. When the process of coating the base material 2 with lead or lead alloy is carried out through deposition, the layers of lead or lead alloy should be at least 40 micrometers thick on the negative side and at most 300 micrometers thick on the positive side.

On the base material 2, onto a first surface 4 of the plate 20, one applies a positive active material 3 which comprises a composition of lead dioxide ($PbO_2$), conductive carbon fibers and glass microspheres. Further, on the base material 2, onto a second surface 6 of the plate 20, one applies a negative active material 5 which comprises a composition of spongy lead (Pb), graphite additives and glass microspheres. The second surface 6 is opposite to the first surface 4 in the same plate 20.

The positive active material 3 and the negative active material 5 have a thickness ranging from 3 to 15 mm.

The glass microspheres represent an additive that is added to the composition of the positive active material 3 and of the negative active material 5, with the function of keeping the pores of the composition of these materials of positive 3 and negative 5 materials open. Thus, in conjunction with other additives, the conductivity is increased and, consequently, the reaction of these active materials in the electrolytic solution, which increases the output of the bipolar battery formed by the plates 20 from 40% (as described in the literature) to 60%.

The bipolar battery 10, which is also an object of the present invention, is formed by a plurality of plates 20 with the characteristics defined before and positioned parallel and consecutive to each other, separated by a usual separating membrane.

The plates 20 comprises the characteristics described before and bring about an increase from 40% (as described in the literature) to 60% in the output of the bipolar battery, by reason of the increase in conductivity and reaction surface of the positive 3 and negative 5 active materials, as already discussed.

These plates 20 are dipped into an electrolyte formed by diluted sulfuric acid in the range from d=1250 to 1310 g/cm$^3$.

It should be pointed out that the bipolar batteries known from the prior art are, as a rule, high-discharge current batteries, that is to say, very high power for a short period of functioning, called start. In the case of the known bipolar batteries, they work at peaks of power and current.

The bipolar battery 10, object of this invention, comprises a suitable construction for its use in photovoltaic systems, which means, that its best performance is with very low discharge current. In this way, one achieves low and constant power, without start peaks, characterizing a stationary battery. In the bipolar battery 10, the plates 20 are arranged parallel and consecutive to each other and compacted to as to form stacks, in a construction of the "sandwich" type, so that the same plate has a negative face that interacts with the positive face of the immediately preceding plate and its opposite positive face that interacts with the negative face of the immediately posterior plate.

The bipolar battery 10, also contains a fiber mat 7, called AGM (absorbent glass mat), the function of which is to provide insulation between the positive 3 and negative 5 active materials, as well as to store diluted sulfuric acid of the electrolyte and conduct oxygen coming from the positive to the negative plate. An O-ring-shaped sealing joint (not shown) is also positioned close to the second surface 6 of the plate 20, for the purpose of insulating the plates 20 and sealing the outlet of the mixture of oxygen and hydrogen generated internally in the plate and in the positive 3 and negative 5 active materials.

Two plastic boards 1A and 1B are added to the plate 20, the board 1A being fixed to the first surface 4 and the board 1B being fixed to second surface 6 of the plate 20. The board 1A has two bores on the upper surface, one for the relief valve 13, and the other 14 to facilitate the process of filling with electrolyte, which will be closed after the activation process.

A lead or lead-alloy coating is also added to the base material 2, on the first surface 4 and second surface 6.

The bipolar battery 10, as illustrated in FIG. 1, has electric terminals 11 and 12 which consist of the positive and negative poles of the battery 10, and relief valve 13 which consist of an internal-pressure device of the battery 10. The battery 10 preferably comprises a relief valve 13 for each plate 20, thus guaranteeing greater security.

The invention claimed is:

1. A plate for a bipolar battery, the plate being of the type that comprises a base material, a positive active material applied to a first surface of the base material and a negative material applied to a second surface of the base material opposite the first surface, the plate being characterized by the fact that:
   the base material consists of graphite in its constitution, said base material being coated with lead or lead alloy and said lead or lead alloy coating having a minimum thickness of 50 micrometers and a maximum thickness of 500 micrometers;
   the positive active material comprises lead dioxide, carbon fibers and glass microspheres in its composition, said positive active material having a thicknesses ranging from 3 to 15 mm;
   the negative active material comprises spongy lead, graphite additives and glass microspheres in its composition, said negative active material having a thicknesses ranging from 3 to 15 mm in which the lead or lead-alloy coating has a minimum thickness of 40 micrometers on the negative said and a maximum thickness of 300 micrometers on the positive side.

2. A plate according to claim 1, characterized in that the lead or lead-alloy coating is applied by a juxtaposition or injection process.

3. A plate for a bipolar battery, the plate being of the type that a base material, a positive active material applied to a first surface of the base material and a negative material applied to a second surface of the base material opposite the first surface, the plate being characterized by the fact that:
   the base material comprises graphite in its constitution, said base material being coated with lead or lead alloy is applied by a juxtaposition or injection process, and wherein the lead or lead-alloy coating has a minimum thickness of 50 micrometers and a maximum thickness of 500 micrometers;
   the positive active material comprises lead dioxide, carbon fibers and glass microspheres in its composition, said positive active material having a thicknesses ranging from 3 to 15 mm;
   the negative active material comprises spongy lead, graphite additives and glass microspheres in its composition, said negative active material having a thicknesses ranging from 3 to 15 mm.

4. A plate according to claim 1, characterized by the fact that the lead or lead-alloy coating is applied by a deposition process.

5. A plate for a bipolar battery, the plate being of the type that a base material, a positive active material applied to a first surface of the base material and a negative material applied to a second surface of the base material opposite the first surface, the plate being characterized by the fact that:
   the base material comprises graphite in its constitution, said base material being coated with lead or lead alloy that is applied by a deposition process, and wherein the lead or lead-alloy coating has a minimum thickness of 40 micrometers on the negative side and a maximum thickness of 300 micrometers on the positive side;
   the positive active material comprises lead dioxide, carbon fibers and glass microspheres in its composition, said positive active material having a thicknesses ranging from 3 to 15 mm;
   the negative active material comprises spongy lead, graphite additives and glass microspheres in its composition, said negative active material having a thicknesses ranging from 3 to 15 mm.

6. A bipolar battery formed by a plurality of plates, each plate comprising a base material, a positive active material applied to a first surface of the base material and a negative active material applied to a second surface of the base material, opposite the first surface, the bipolar battery being characterized by the fact that:
   the base material of the plate consists of graphite in its constitution, said base material being coated with lead or lead alloy;
   the positive active material comprises lead dioxide, carbon fibers and glass microspheres in its composition, said positive active material having a thicknesses ranging from 3 to 15 mm;
   the negative active material comprises spongy lead, graphite additives and glass microspheres in its composition, said negative active material having a thicknesses ranging from 3 to 15 mm.

7. A bipolar battery according to claim 6, characterized by the fact that the lead or lead-alloy coating is made by a juxtaposition or injection process.

8. A bipolar battery formed by a plurality of plates, each plate comprising a base material, a positive active material applied to a first surface of the base material and a negative active material applied to a second surface of the base material, opposite the first surface, the bipolar battery being characterized by the fact that:
   the base material of the plate comprises graphite in its constitution, said base material being coated with lead or lead alloy that is made by a juxtaposition or injection process, and wherein the lead or lead-alloy coating has a minimum thickness of 50 micrometers and a maximum thickness of 500 micrometers;
   the positive active material comprises lead dioxide, carbon fibers and glass microspheres in its composition, said positive active material having a thicknesses ranging from 3 to 15 mm;

the negative active material comprises spongy lead, graphite additives and glass microspheres in its composition, said negative active material having a thicknesses ranging from 3 to 15 mm.

9. A bipolar battery according to claim 6, characterized by the fact that the lead or lead-alloy coating is made by a deposition process.

10. A bipolar battery according to claim 9, characterized by the fact that the lead or lead-alloy coating has a minimum thickness of 40 micrometers on the negative side and a maximum thickness of 300 on the positive side.

11. A bipolar battery according to claim 6, characterized by the fact that the plates are arranged parallel and consecutive to each other and compacted so as to form stacks.

12. A plate for a bipolar battery, the plate being of the type that comprises a base material, a positive active material applied to a first surface of the base material and a negative material applied to a second surface of the base material opposite the first surface, the plate being characterized by the fact that:
- the base material comprises graphite in its constitution, said base material being coated with lead or lead alloy having a minimum thickness of 50 micrometers and a maximum thickness of 500 micrometers;
- the positive active material comprises lead dioxide, carbon fibers and glass microspheres in its composition, said positive active material having a thicknesses ranging from 3 to 15 mm;
- the negative active material comprises spongy lead, graphite additives and glass microspheres in its composition, said negative active material having a thicknesses ranging from 3 to 15 mm.

* * * * *